(12) United States Patent
Kume et al.

(10) Patent No.: US 10,220,457 B2
(45) Date of Patent: Mar. 5, 2019

(54) CUTTING DEVICE

(71) Applicant: MAKITA CORPORATION, Anjo-shi (JP)

(72) Inventors: Sho Kume, Anjo (JP); Hirotomo Inayoshi, Anjo (JP); Yan Shi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 15/386,070

(22) Filed: Dec. 21, 2016

(65) Prior Publication Data

US 2017/0197262 A1 Jul. 13, 2017

(30) Foreign Application Priority Data

Jan. 13, 2016 (JP) ................................. 2016-004415

(51) Int. Cl.
| | |
|---|---|
| *B23D 45/16* | (2006.01) |
| *B25F 5/02* | (2006.01) |
| *B23D 47/12* | (2006.01) |
| *B23D 47/00* | (2006.01) |

(52) U.S. Cl.
CPC ............. *B23D 45/16* (2013.01); *B23D 47/00* (2013.01); *B23D 47/12* (2013.01); *B25F 5/02* (2013.01)

(58) Field of Classification Search
CPC ........ B23D 47/00; B23D 47/12; B23D 45/16; B25F 5/02
USPC .......................................................... 30/388
See application file for complete search history.

(56) References Cited

U.S. PATENT DOCUMENTS

| | | | | |
|---|---|---|---|---|
| 4,406,064 A | * | 9/1983 | Goss | B27B 9/00 30/298.4 |
| 4,787,145 A | * | 11/1988 | Klicker | B27B 9/00 248/291.1 |
| 4,870,758 A | * | 10/1989 | Fushiya | B27B 9/02 30/296.1 |
| 5,075,976 A | * | 12/1991 | Young | B27G 19/04 30/391 |
| 5,850,697 A | * | 12/1998 | Welch | B27G 19/04 30/391 |
| 8,424,213 B2 | * | 4/2013 | Fukinuki | B27B 9/00 30/374 |
| 8,935,857 B2 | * | 1/2015 | Inayoshi | B23D 45/16 30/388 |
| 2004/0060178 A1 | * | 4/2004 | Willer | B27B 9/00 30/391 |

(Continued)

FOREIGN PATENT DOCUMENTS

| | | |
|---|---|---|
| CN | 100434215 C1 | 11/2008 |
| CN | 201346645 Y | 11/2009 |

(Continued)

OTHER PUBLICATIONS

Unpublished U.S. Appl. No. 16/063,039, filed Jun. 15, 2018.

(Continued)

*Primary Examiner* — Hwei-Siu C Payer
(74) *Attorney, Agent, or Firm* — J-Tek Law PLLC; Jeffrey D. Tekanic; Scott T. Wakeman

(57) ABSTRACT

A cutting device may include a main body supported on the upper side of a base. The main body includes a rotary blade and a fixed cover partially covering the rotary blade. A handle is attached to the fixed cover and extends rearward therefrom.

23 Claims, 4 Drawing Sheets

(56) References Cited

U.S. PATENT DOCUMENTS

| | | | | |
|---|---|---|---|---|
| 2011/0088267 A1* | 4/2011 | Wikle | ............... | B23D 47/126 30/388 |
| 2011/0214547 A1 | 9/2011 | Inayoshi | | |
| 2013/0097878 A1* | 4/2013 | Naito | ............... | B23D 47/12 30/374 |
| 2014/0215839 A1* | 8/2014 | Abe | ............... | B25F 5/001 30/388 |
| 2015/0266201 A1 | 9/2015 | Nakashima | | |
| 2015/0328796 A1* | 11/2015 | Okouchi | ............... | B27B 9/02 30/377 |
| 2017/0197262 A1* | 7/2017 | Kume | ............... | B23D 45/16 |
| 2018/0207831 A1* | 7/2018 | Masatoshi | ............... | H01M 2/1022 |

FOREIGN PATENT DOCUMENTS

| | | | |
|---|---|---|---|
| CN | 202239912 U | | 5/2012 |
| CN | 103056850 A | | 4/2013 |
| CN | 203636085 U | | 6/2014 |
| CN | 103962631 A | | 8/2014 |
| CN | 104942362 A | | 9/2015 |
| EP | 3 181 280 A1 | * | 6/2017 |
| EP | 3 181 305 A1 | * | 6/2017 |
| EP | 3 181 306 A1 | * | 6/2017 |
| JP | 2003089101 A | | 3/2003 |
| JP | 2011183463 A | | 9/2011 |
| JP | 2015178154 A | | 10/2015 |
| WO | 2017102673 A1 | | 6/2017 |
| WO | 2017102678 A1 | | 6/2017 |
| WO | 2017102690 A1 | | 6/2017 |

OTHER PUBLICATIONS

Unpublished U.S. Appl. No. 16/062,998, filed Jun. 15, 2018.
Office Action from the Chinese Patent Office dated Dec. 3, 2018 in counterpart Chinese application No. 201610963694.8, and machine translation thereof.

* cited by examiner

CUTTING DEVICE

CROSS-REFERENCE

This application claims priority to Japanese patent application no. 2016-4415 filed on Jan. 13, 2016, the contents of which are fully incorporated herein by reference.

TECHNICAL FIELD

The present disclosure is directed to a cutting device for cutting a workpiece. In preferred embodiments, the present disclosure is directed to a cutting device, such as a circular saw, having a circular rotary blade and an electric motor that serves as a drive device for rotating the circular rotary blade.

BACKGROUND ART

Some known cutting devices, such as circular saws, are designed to be used to cut a workpiece while the user is standing or crouching (bending over) and one foot is (or both feet are) on the workpiece. For example, Japanese Laid-Open Patent Publication No. 2003-089101 discloses a cutting device designed to cut a workpiece while the user is standing. This cutting device has a D-shaped handle that can be grasped by the user to hold and control the cutting device. The D-shaped handle extends from a portion of the main body of the cutting device rearward of the rotary blade so that the handle extends rearward, by a relatively large distance, from a rear end of a base that supports the main body. The cutting device further includes an electric motor serving as the drive device for the rotary blade. The electric motor has a motor shaft whose axis intersects the rotational axis of a spindle, on which the rotary blade is mounted. Therefore, the motor shaft extends along a direction parallel to the cutting plane of the rotary blade. A high precision and relatively expensive reduction gear train operably couples the output shaft of the electric motor to the spindle. For example, a suitable reduction gear train is a hypoid gear train manufactured by the Gleason Corporation of Rochester, N.Y. that includes an output spiral bevel gear and an input spiral bevel gear arranged such that their rotational axes are offset from each other.

Japanese Laid-Open Patent Publication No. 2011-183463 and its family member US 2011/0214547 disclose a cutting device having a relatively small size. The cutting device has a circular, elongated (or rod-shaped) handle extending from a rearward portion of the main body of the cutting device and rearward of the rotary blade. In this cutting device, an electric motor serves as the drive device and is arranged such that its motor shaft extends parallel to the spindle that rotatably drives the rotary blade.

Japanese Laid-Open Patent Publication No. 2015-178154 and its family member US 2015/0266201 disclose a cutting device (portable circular saw) having a handle that is attached to the motor housing at a position substantially corresponding to a rear half of a fixed cover of the main body and near a rotary blade.

In many known designs for portable cutting devices (e.g., circular saws), the handle extends from the tool main body in the vicinity of substantially the rear half of the fixed cover that covers the rotary blade (on the side of the fixed cover opposite of an open side that exposes the circular saw blade, i.e. the side of the fixed cover adjacent to the motor housing) and is at least partially proximal (adjacent) to the rotary blade that cuts a workpiece, similar to the handle arrangement disclosed in Japanese Laid-Open Patent Publication No. 2015-178154 and US 2015/0266201. This arrangement of the handle is intended to ensure that the portion of the main body that supports the handle is sufficiently rigid (strong) to stiffly support the handle and prevent possible bending of the handle at (about) the support portion, which may be caused by an externally-applied force. The rigidity (or stiffness) of the portion of the main body that supports the handle will be hereinafter called "support rigidity." On the other hand, in the handle arrangements disclosed in Japanese Laid-Open Patent Publication Nos. 2003-089101 and 2011-183463 and US 2011/0214547, the handle is designed to extend rearward, by a relatively large distance, from a portion of the tool main body adjacent to the rear half of the fixed cover. Therefore, these handle arrangements may exhibit insufficient support rigidity at the handle support portion.

SUMMARY

There has been a need in the art for a technique (design) that will ensure sufficient rigidity of a support portion for supporting a cutting device handle that extends rearward from a portion of a fixed cover that covers a rotary blade.

In one aspect according the present disclosure, a cutting device may include a device body and a base. The device body may include an electric motor, a circular rotary blade rotatably driven by the electric motor, a fixed cover configured to cover an upper half of the circular rotary blade, and a handle including a grip configured to be grasped by a user. The base may support, e.g., pivotably support, the device body on an upper side of the base. A lower portion of the circular rotary blade may protrude downward from (through) the base so as to cut into a workpiece as the cutting device moves in a cutting direction. The base may have a front end opposite to a rear end in the cutting direction. The handle may extend along a direction parallel to the (cutting) plane of the circular rotary blade and may include a rear portion that projects (extends) rearward beyond the rear end of the base in the cutting direction. The grip may be disposed at the rear portion of the handle. The handle may be joined (attached, affixed) to the fixed cover at a position proximal to the grip on a front side of the grip in the cutting direction.

With this arrangement, the handle of the cutting device extends along a direction parallel to the (cutting) plane of the circular rotary blade and a rear portion of the handle projects (protrudes) rearward beyond the rear end of the base in the cutting direction. Therefore, the handle can be joined (affixed, attached) to the fixed cover at a position proximal (adjacent) to the front side of the grip in the cutting direction, thereby ensuring sufficient support rigidity of the handle without depending on the arrangement and/or placement of the electric motor. Therefore, there is no need to arrange the electric motor such that its motor axis (rotational axis) extends parallel to the (cutting) plane of the rotary blade. Instead, the electric motor may be arranged such that its motor axis extends perpendicular to the (cutting) plane of the rotary blade, thereby enabling the use of a less expensive reduction gear train to operably couple the motor shaft to a spindle that supports the circular blade. As a result, it is possible to reduce the manufacturing cost of the cutting device, as compared to cutting devices that utilize more expensive hypoid gears.

Such a cutting device may further include a handle support portion extending rearward from the fixed cover in the cutting direction. The handle may be joined (affixed, attached) to the fixed cover, partially or entirely, via the handle support portion.

By joining (affixing, attaching) the handle to the handle support portion, for example, at a suitable number of positions, the handle may be supported so that it extends along at least a rearward portion of the side of the fixed cover that faces the electric motor, while still ensuring sufficient support rigidity for the handle.

The fixed cover and the handle support portion may both be formed of metal. If a metal fixed cover and a metal handle support portion are utilized in one embodiment of the present teachings, sufficient support rigidity of the handle can be ensured without an accompanying increase in the size of the fixed cover and/or the handle support portion.

The device body may further include a battery mount portion configured to detachably mount (attach) at least one battery pack that serves as a power source for the electric motor. The battery mount portion may be disposed rearward of the electric motor (tool motor housing) in the cutting direction and may extend rearward away from the electric motor. The handle may extend rearward from a rear portion (rearward-most edge) of the battery mount portion in the cutting direction.

With such an arrangement, by joining (affixing, attaching) the battery mount portion to the fixed cover, for example, at a suitable number of positions along the extension direction of the battery mount portion, the handle may also be indirectly joined (affixed, attached) to the fixed cover, thereby ensuring sufficient support rigidity for the handle. For example, this arrangement optionally may be combined with an arrangement of the electric motor in which the motor axis (the rotational axis of the motor shaft) extends perpendicular to the (cutting) plane of the rotary blade for use in advantageous embodiments of the present cutting devices designed so that a user can cut a workpiece while standing with one foot or both feet on the workpiece.

The at least one battery pack may comprise two battery packs, and the battery mount portion may be configured such that the two battery packs are arranged side-by-side in a direction parallel to the cutting direction when mounted on the battery mount portion.

Such an arrangement enables a relatively large amount of electric power to be supplied to the electric motor to improve the cutting performance of the cutting device while still providing a relatively compact cutting device in the left-to-right (width) direction (i.e. the direction perpendicular to the cutting direction) of the cutting device.

In another aspect according to the present disclosure, a cutting device may include a device body and a base. The device body may include an electric motor, a circular rotary blade rotatably driven by the electric motor, a fixed cover configured to cover an upper half of the circular rotary blade, and a handle including a grip configured to be grasped by a user. The base may support, e.g., pivotably support, the device body on an upper side of the base. A lower portion of the circular rotary blade protrudes downward from (through) the base to cut into a workpiece as the cutting device moves in a cutting direction. The base may have a front end opposite a rear end in the cutting direction. The handle may be configured as a D-shaped handle and may include a rear portion that projects (protrudes) rearward beyond the rear end (rearward-most edge) of the base. The electric motor may be arranged such that the rotational axis of its motor shaft extends parallel to the rotational axis of the rotary blade, and thus perpendicular to the cutting plane of the rotary cutting blade.

With such an arrangement, the rear portion of the D-shaped handle projects (protrudes) rearward beyond the rear end of the base in the cutting device; in addition the rotational axis of the motor shaft of the electric motor extends parallel to the rotational axis of the rotary blade. Therefore, this arrangement may be utilized to design a convenient portable cutting device that enables the user to grasp the D-shaped handle and easily (comfortably) cut a workpiece while standing with one foot or both feet on the workpiece. In addition, by arranging the rotational axis of the motor shaft of the electric motor so as to extend parallel to the rotational axis of the rotary blade, such a design permits the use of a less expensive gear train than is required when the rotational axes of the motor shaft and the spindle intersect. As a result, this arrangement also makes possible a further reduction in the manufacturing cost of the cutting device.

The electric motor optionally may be a brushless motor that enables a more compact design of the electric motor in the motor axis direction. Hence, in such an embodiment of the present teachings, a compact cutting device in the left-to-right direction (widthwise direction) perpendicular to the plane of the rotary blade (or the cutting direction) can be realized.

DETAILED DESCRIPTION

Figure 1:
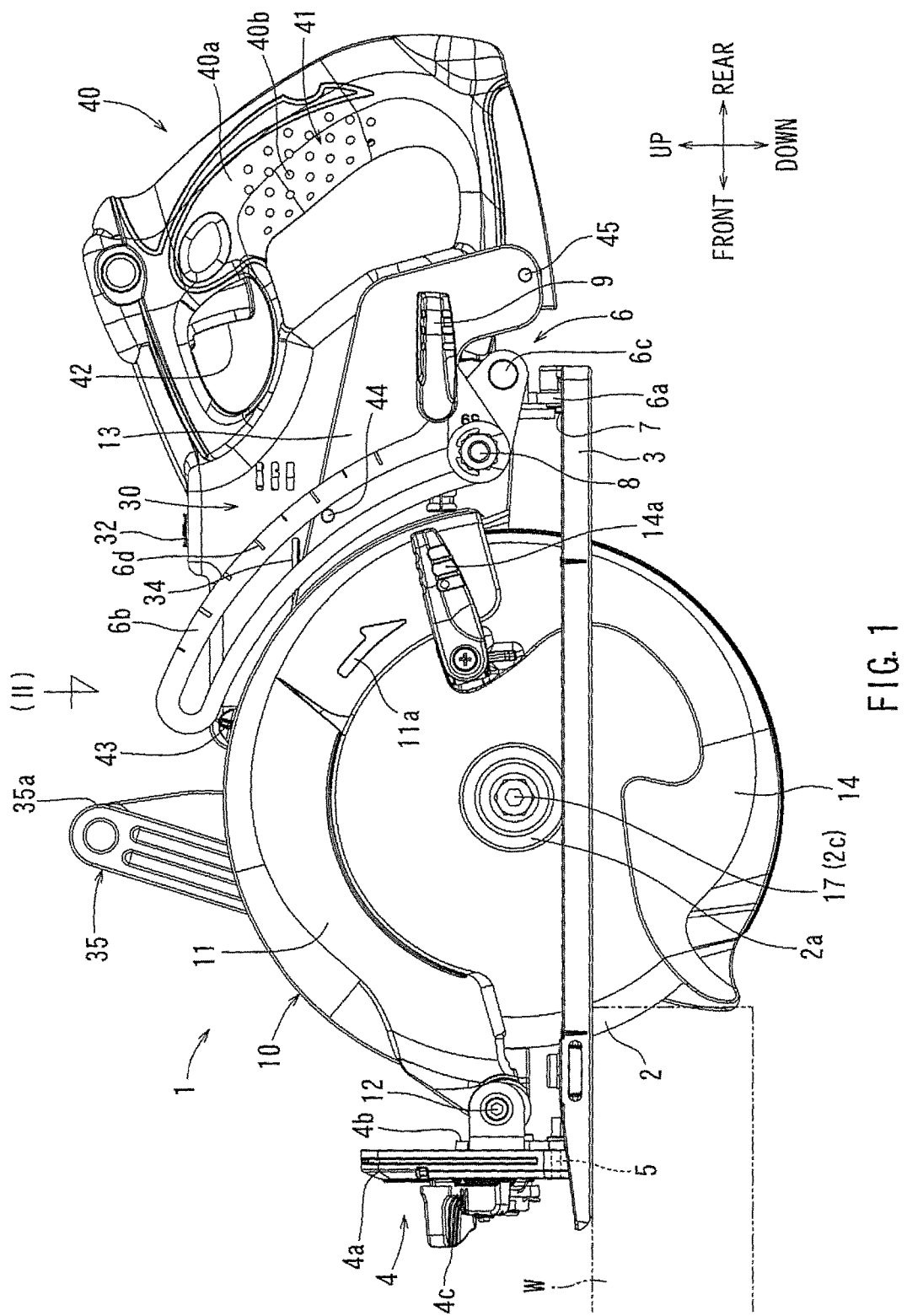
FIG. 1 is a left-side elevational view of a cutting device according to a representative embodiment of the present disclosure.

A representative embodiment of the present disclosure will now be explained with reference to FIGS. 1 to 4, in which a circular saw will be utilized as one representative, non-limiting example of a cutting device 1 according to the present disclosure. In particular, in this representative embodiment, the cutting device 1 generally includes a main body 10 and a base 3. The main body 10 includes a handle 40 that extends rearward from the main body 10. Therefore, the cutting device 1 can be suitably used by a user to cut a workpiece while standing with one foot or both feet on the workpiece. The main body 10 includes an electric motor 20 and a rotary blade 2, e.g., a circular saw blade, that is rotatably driven by the electric motor 20. The main body 10 is supported by the base 3 on the upper side thereof. The base 3 includes a substantially rectangular window (slot) 3a, through which the lower portion of the rotary blade 2 can protrude downward from (through) the lower surface of the base 3 (see FIG. 4). When the lower portion of the rotary blade 2 protrudes downward from (through) the base 3, it can be used to cut into a workpiece W as will be explained further below.

The handle 40 of the main body 10 is configured to be grasped by the user to hold and maneuver the cutting device 1. In order to perform a typical cutting operation, the user may be positioned on the rear side of the cutting device 1 and may hold the cutting device 1 by grasping the handle 40. In this position, the user can move (push) the cutting device 1 forward (i.e. in a cutting direction) along the upper surface of the workpiece W. In the present disclosure, the front direction (forward), the rear direction (rearward), the left direction (leftward) and the right direction (rightward) are determined with reference to the position of the user holding the cutting device 1 when performing a typical cutting operation.

The main body 10 may further include a fixed cover 11 that covers the outer periphery (i.e., the cutting edge) of substantially all of the upper half of the rotary blade 2. The fixed cover 11 also may be called, e.g., a stationary cover, a stationary blade case, a stationary blade guide, an upper blade guide or any variation/combination thereof. In this embodiment, the fixed cover 11 is preferably made of metal, such as magnesium or magnesium alloy. The front portion of the fixed cover 11 is connected to a front pivotal support device 4 such that the fixed cover 11 is vertically pivotable relative to the base 3 via a pivotal support shaft 12 because the front pivotal support device 4 is attached to the front portion of the upper surface of the base 3. Therefore, the main body 10 is vertically pivotable about the pivotal support shaft 12 relative to the base 3 so that the distance that the rotary blade 2 protrudes from (through) the lower surface of the base 3 can be changed to adjust the cutting depth of the rotary blade 2 into the workpiece W.

Figure 2:
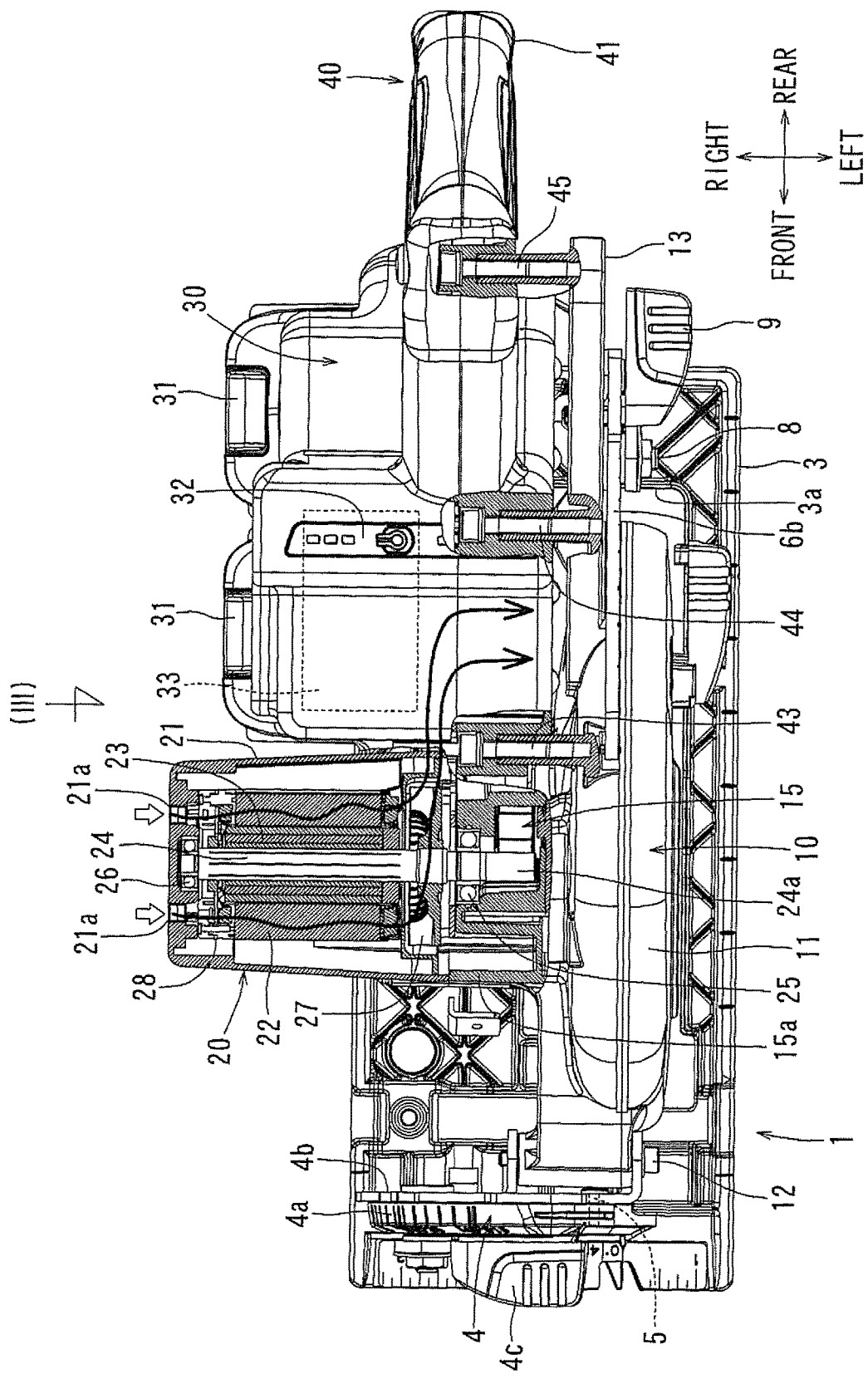
FIG. 2 is a plan, cutaway view of the cutting device with an electric motor and a support portion of a handle of the cutting device exposed in horizontal cross section to show their internal structures.
Figure 3:
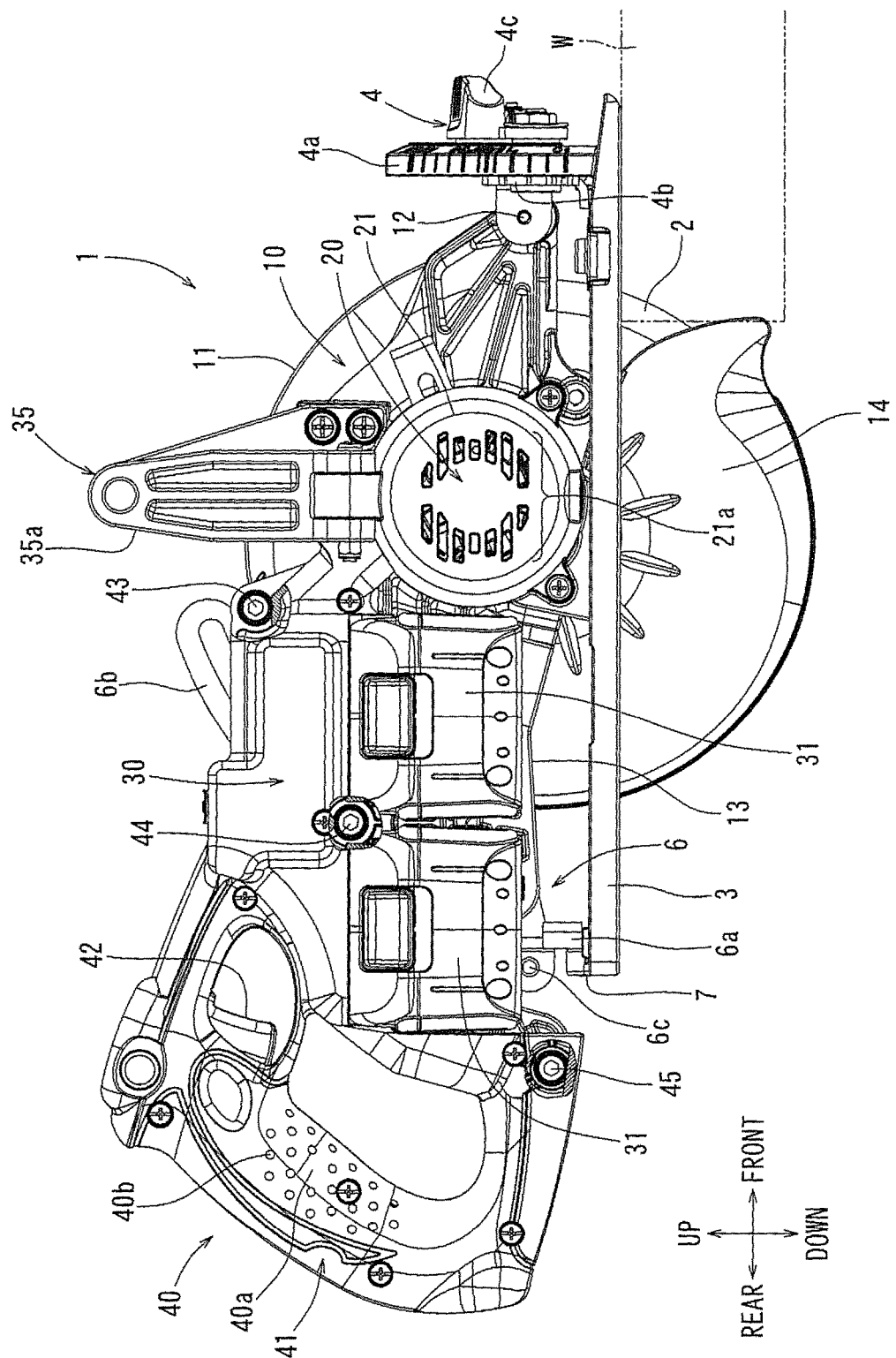
FIG. 3 is a right-side elevational view of the cutting device.

As shown in FIGS. 1-3, the front pivotal support device 4 includes an angular plate 4a and a bracket 4b. The angular plate 4a is fixedly attached to the upper surface of the base 3 and extends vertically upward therefrom. The bracket 4b is disposed on the rear side of the angular plate 4a and is supported by the angular plate 4a via a pivot shaft 5 so that the bracket 4b can pivot laterally (leftward and rightward) relative to the angular plate 4a about the axis of the pivot shaft 5. The pivotal support shaft 12 is supported on the bracket 4b. The laterally pivoted position of the bracket 4b relative to the angular plate 4a can be releasably fixed by rotating (tightening) a fixing lever 4c.

A rear pivotal support device 6 is provided between the rear portion of the fixed cover 11 and the upper surface of the base 3. As shown in FIG. 1, the rear pivotal support device 6 includes a base bracket 6a and a depth guide 6b. The base bracket 6a is supported by the base 3 via a pivotal support shaft 7 so that the base bracket 6a can pivot laterally relative to the base 3. The depth guide 6b is pivotally supported by the base bracket 6a via a pivotal support shaft 6c so that the depth guide 6 can pivot forward and rearward relative to the base bracket 6a. In this embodiment, the pivotal support shaft 5 for the front portion of the fixed cover 11 is axially aligned (coaxial) with the pivotal shaft 7 for the rear portion of the fixed cover 11. Therefore, the main body 10 (including the fixed cover 11) can pivot leftward or rightward from a vertical position relative to the base 3 to adjust the cutting angle of the rotary blade 2 with respect to the workpiece W. When the main body 10 is in the vertical position, the (cutting) plane of the rotary blade 2 is substantially perpendicular to the lower surface of the base 3 (i.e., substantially perpendicular to the upper surface of the workpiece W).

The depth guide 6b is curved along an arc and serves to guide vertical pivoting movement of the main body 10 about the pivotal support shaft 6c. By fixing the main body 10 in position relative to the depth guide 6b, the vertical pivoted position of the main body 10 can be fixed relative to the base 3. In this embodiment, by screwing and tightening a screw 8 into a handle support portion 13 of the main body 10, the handle support portion 13 can be fixed relative to the depth guide 6b. The handle support portion 13 will be further described below. A scale 6d that indicates the cutting depth of the rotary blade 2 may be marked on an arc-shaped edge of the depth guide 6b. The screw 8 may be coupled to a lever 9 so that the lever 9 can be vertically pivoted to tighten or loosen the screw 8. As shown in FIG. 1, an outline arrow 11a indicating the normal rotational direction of the rotary blade 2 may be marked on the left side surface of the fixed cover 11.

A movable cover (blade case or blade guide) 14 is provided to cover and uncover substantially the lower half of the outer periphery (cutting edge) of the rotary blade 2. The movable cover 14 is mounted to (on) the fixed cover 11 such that it can rotate about a rotational axis to open and close (uncover and cover) the outer periphery of the lower half of the rotary blade 2 during operation of the cutting device 1. The rotational axis of the movable cover 14 may be proximal to or coincide with the rotational axis of the rotary blade 2. A spring (not shown) may be provided to bias the movable cover 14 toward its closed position. When the movable cover 14 is located in its closed position, it may cover substantially all of the lower half outer periphery of the rotary blade 2. An opening/closing lever 14a is attached to the rear portion (counterclockwise end portion as viewed in FIG. 1) of the movable cover 14 on the left side of the cutting device 1 (according to the directions indicated in FIG. 2). The user can grasp the opening/closing lever 14a to manually (forcibly) open the movable cover 14 against the biasing force of the spring. In a normal cutting operation, the user may place the cutting device 1 on the upper surface of the workpiece W such that the front end of the movable cover 14 opposes the end surface of the workpiece W. Then, the user may move (push) the cutting device 1 forward along the upper surface of the workpiece W. As the cutting device 1 moves forward, the front end of the movable cover 14 may contact the end surface of the workpiece W. Moving the cutting device 1 further forward will cause the movable cover 14 to open against the biasing force of the spring.

Referring again to FIG. 2, the electric motor 20 has a motor shaft 24. A motor housing 21 for the electric motor 20 is joined (attached, affixed) to the right side (i.e. the motor housing side) of the fixed cover 11 via a reduction gear housing 15a. In this embodiment, the motor axis, i.e., the rotational axis of the motor shaft 24, of the electric motor 20 extends perpendicular to the cutting plane of the rotary blade 2. When the main body 10 is in the vertical position, the motor axis may extend substantially parallel to the lower surface of the base 3. A reduction gear 15 includes a reduction gear train (16, 24a) disposed in the gear housing 15a. The gear housing 15a may be formed of metal, such as magnesium or magnesium alloy. In this embodiment, the gear housing 15a is formed integrally with the right side surface (or first surface) of the fixed cover 11. The motor housing 21 also may be formed of metal, such as aluminum or aluminum alloy, and joined (attached, affixed) to the right end of the gear housing 15a by suitable connectors, such as screws. Alternatively, the motor housing 21 may be formed of resin.

The electric motor 20 may be an inner-rotor type brushless motor and may include a cylindrical tubular stator 22 and a rotor 23 rotatably supported within the stator 22. Because a brushless motor does not require a commutator or brushes for the rotor 23, the electric motor 20 can be designed in a compact manner in its axial direction (i.e., the left-to-right direction of the cutting device 1). The rotor 23 is mounted on (attached to) the motor shaft 24 so that the motor shaft 24 rotates together with the rotor 23 and serves as a central shaft of the rotor 23. The left end of the motor shaft 23 is rotatably supported by a first bearing 25 held by (in) the gear housing 15a, and the right end of the motor shaft 23 is rotatably supported by a second bearing 26 held by (in) the end wall (right side wall) of the motor housing 21. A cooling fan 27 is attached to the motor shaft 24 at a position between the first bearing 25 and the rotor 23.

When electric motor 20 is started, it causes the cooling fan 27 to rotate, which draws external air into the motor housing 21 via a plurality of air inlet holes 21a formed in the end wall of the motor housing 21 as shown in FIG. 3. As indicated by arrows in FIG. 2, the air introduced into the motor housing 21 may flow through the motor housing 21 in the axial direction thereof (leftward in FIG. 2) to cool the stator 22 and the rotor 23.

Figure 4:
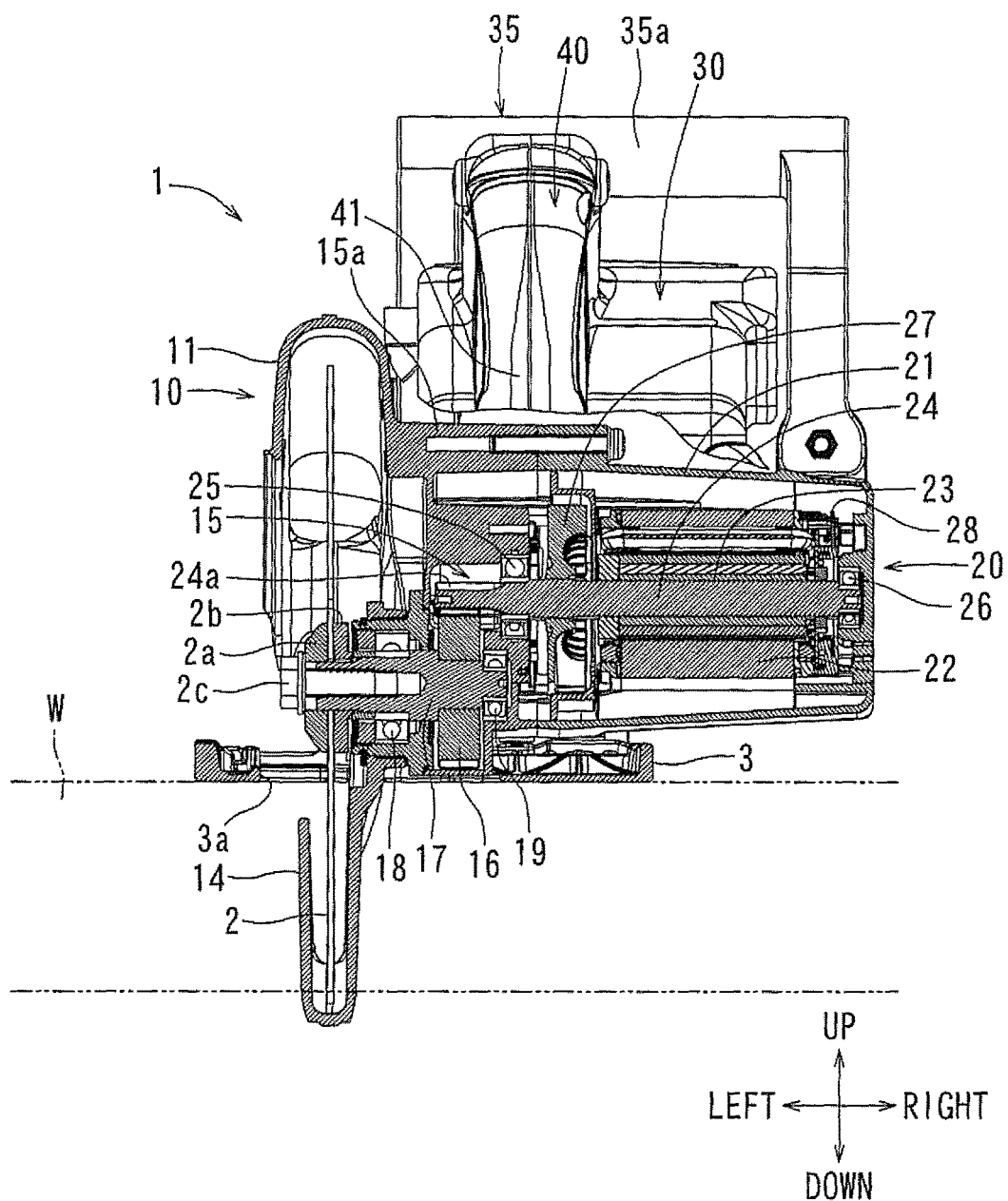
FIG. 4 is a vertical sectional view of the cutting device as viewed from the rear side.

A drive gear (pinion gear) 24a may be formed on or attached to the left end portion of the motor shaft 24. The drive gear 24a is in engagement (meshes) with a driven gear 16 that is attached to a spindle 17, as shown in FIG. 4. The drive gear 24a and the driven gear 16 constitute a reduction gear train that causes the spindle 17 to rotate at a lower rotational speed than the motor shaft 24, but with higher torque. The spindle 17 is rotatably supported by third and fourth bearings 18 and 19 held in the gear housing 15a. The third bearing 18 is disposed at a position proximal to the rotary blade 2. The fourth bearing 19 is disposed at a position farther from the rotary blade 2 in the axial direction of the spindle 17. The spindle 17 extends at least substantially parallel to the motor shaft 24.

The left end of the spindle 17 extends into the interior of the fixed cover 11. The rotary blade 2 is attached to the protruding end of the spindle 17. More specifically, the rotary blade 2 is fixedly attached to the spindle 17 by an attaching device that may include an outer flange 2a, an inner flange 2b and a fixing bolt 2c. The outer flange 2a and the inner flange 2b serve to clamp the rotary blade 2 therebetween in a direction perpendicular to the plane of the rotary blade 2 (i.e., in the axial direction of the spindle 17). The fixing bolt 2c can threadably engage a corresponding threaded hole formed in the left end surface of the spindle 17. By engaging and tightening the fixing bolt 2c into the threaded hole, a pressing force is applied against the outer flange 2a toward the rotary blade 2 so that the rotary blade 2 is clamped between the outer flange 2a and the inner flange 2b. In this way, the rotary blade 2 can be fixed to (locked against) the spindle 17 so that it cannot move in the axial direction and cannot to rotate about the axis of the spindle 17.

As shown in FIGS. 2 and 3, a battery mount portion 30 is disposed adjacent to the rear half (right side) of the fixed cover 11 and rearward of the electric motor 20. That is, the battery mount portion 30 is disposed so that it partially overlaps the motor housing side of the fixed cover 11 in the front-rear direction of the cutting device 1. The battery mount portion 30 extends rearward from a position proximal to the electric motor 20 and may have a substantially flat-box shape. The battery mount portion 30 is configured such that two rechargeable battery packs 31 can be respectively removably mounted on (attached to) the lower (downward) surface of the battery mount portion 30. When the battery packs 31 are mounted on the battery mount portion 30, the battery packs 31 are arranged side-by-side in the front-to-rear direction in the present embodiment, although other arrangements (e.g., front-to-back, etc.) of the two battery packs 31 are possible and within the scope of the present teachings. Each battery pack 31 may be a general-use, power tool battery pack containing lithium-ion battery cells having a total output voltage, e.g., of 18 V and can be mounted on various types of electric power tools other than circular saws, such as e.g., electric driver-drills, impact wrenches, etc., to serve as the power source thereof. The battery packs 31 can be recharged by a battery charger so that they can be repeatedly used. In this representative embodiment, the two battery packs 31 can supply an electric current at a voltage of 36 V when mounted on the battery mount portion 30. More specifically, when the two battery packs 31 are mounted on the battery mount portion 30, they are electrically connected in series to supply an electric current at a total (combined) voltage of 36 V to the electric motor 20.

As shown in FIGS. 1 and 2, a control display 32 is disposed (mounted) on the upper surface of the battery mount portion 30. The control display 32 may include one or more LEDs that may be selectively lit to indicate one or more operating conditions of the electric motor 20 and/or the remaining charge level (remaining battery capacity) of the battery packs 31. A controller 33 may be disposed within the battery mount portion 30. The controller 33 may control the operation of the electric motor 20, and a sensor circuit board 28 is attached to one of the opposite end portions of the stator 22 of the electric motor 20 on the side opposite the rotary blade 2 in the axial direction of the motor shaft 24. The controller 33 may include a control circuit (e.g., a circuit board having at least one microprocessor and other supporting electric circuits, such as memory storing an operating program and/or operating conditions, input/output devices, etc.) that outputs a control signal based on information regarding the rotational position of the rotor 23 detected by the sensor circuit board 28, a drive circuit that switches the current across the electric motor 20 according to the detected rotational position of the rotor 23, and an auto-stop circuit that interrupts the supply of electric current to the electric motor 20 according to detection signals output from the battery packs 31 to prevent over discharge and/or overcurrent conditions of the battery packs 31.

As indicated by wavy arrows in FIG. 2, cooling air within the motor housing 21 may be deflected to flow into the battery mount portion 30. To this end, communication holes (not shown) may be formed in the motor housing 21 for communicating with corresponding communication holes (not shown) formed in the battery mount portion 30. Therefore, the cooling air may directly flow from within the motor housing 21 into the battery mount portion 30 for cooling the controller 33. In this representative embodiment, the communication holes formed in the motor housing 21 directly communicate with the corresponding communication holes formed in the battery mount portion 30. Optionally, a suitable sealing device may be provided to prevent leakage of cooling air from the communication holes to the outside. Alternatively, tubes or the like may be used to provide fluid communication between the communication holes formed in the motor housing 21 and the corresponding communication holes formed in the battery mount portion 30. After cooling the controller 33, the cooling air may then be discharged to the outside via one or more discharge openings 34 (only a part of one is shown in FIG. 1) formed in the left side surface of the battery mount portion 30.

A rear handle 40 is disposed at the rear portion of the battery mount portion 30. In this embodiment, the rear handle 40 is a so-called D-shaped handle and extends within a plane that is substantially parallel to the plane of the rotary blade 2. The battery mount portion 30 and the rear handle 40 may be integrally formed of resin. The rear handle 40 extends rearward from the rear portion of the battery mount portion 30 to a position beyond the rear end (rearward-most edge) of the base 3 in the cutting direction. In this embodiment, the rear handle 40 extends rearward beyond the rear end of the base 3 when the main body 10 is positioned anywhere between its lower limit position, shown in FIGS.

1, 3 and 4, and a position raised above the lower limit position by a small angle or distance within a vertical pivotable range limited by the depth guide 6b. The rear portion of the rear handle 40 has a length in the up-to-down direction (height) and is configured with a rear grip 41 to be grasped by a hand of the user. The outer surface of the rear grip 41 may be covered with an elastomeric resin layer 40a for preventing slippage of the user's hand (i.e. to provide an improved grip). A suitable number of depressions 40b may be formed on the surface of the elastomeric resin layer 40a for enhancing the slippage preventing function. A trigger-type switch lever 42 may be disposed at the upper portion of the rear handle 40 on the upper side of the rear grip 41. In order to start the electric motor 20 and thereby cause the rotary blade 2 to rotate, the user pulls (squeezes) the switch lever (trigger switch) 42 using the index finger of the hand that grasps the rear grip 41.

As shown in FIGS. 1 and 2, the handle support portion 13 may be shaped as an at least substantially flat plate and may extend rearward from the rear portion (right side surface or first side surface) of the fixed cover 11 in the front-rear direction, and substantially parallel to the plane of the rotary blade 2. The handle support portion 13 may be formed of the same metal material as the fixed cover 11 and may be formed (molded, cast, etc.) integrally therewith, or may be a discrete component that is joined (affixed, attached) to the fixed cover 11, as will be further discussed below. That is, the handle support portion 13 may be integrally joined to the motor housing side of the fixed cover 11 without any seam therebetween, or the handle support portion 13 may be joined (attached, affixed) to the motor housing side of the fixed cover 11 via one or more fasteners, such as screws.

As shown in FIGS. 1-3, the battery mount portion 30 is joined (affixed, attached) to the fixed cover 11 at a first fixing position by using a first fixing screw 43. Rearward thereof, the battery mount portion 30 is joined (affixed, attached) to the handle support portion 13 at second and third fixing positions by using second and third screws 44 and 45, respectively. The third fixing position is located rearward of the second fixing position. More specifically, the first fixing screw 43 fixes the battery mount portion 30 directly to the rear half (right side surface) of the fixed cover 11. The second and third fixing screws 44 and 45 fix the battery mount portion 30 to intermediate and rearward surfaces, respectively, (right side surface) of the handle support portion 13, thereby indirectly attaching the battery mount portion 30 to the fixed cover 11. Hence, the rear handle 40 is directly or indirectly joined (attached, affixed) to the fixed cover 11 at three different positions along a direction parallel to the plane of the rotary blade 2 (more specifically, in the front-to-rear direction of the cutting device 1) via the battery mount portion 30 (i.e. directly) and via the handle support portion 13 and the battery mount portion 30 (i.e. indirectly). Therefore, the handle 40 can be supported by the fixed cover 11 with a sufficient rigidity (stiffness) even though the rear handle 40 extends rearward thereof by a relatively large distance. In this way, the rear handle 40 can be prevented from deflecting (bending) mainly in the left and right directions.

As shown in FIGS. 1 and 3, a front handle 35 may be disposed at the upper portion of the electric motor 20. As shown in FIG. 4, the front handle 35 may have a shape like a bridge extending from the upper surface of the right side portion of the electric motor 20 to the right side surface (motor housing side) of the fixed cover 11. The upper portion of the front handle 35 extends in the left-to-right direction, parallel to the axial direction of the electric motor 20, and serves as a front grip 35a. In order to hold and operate (maneuver) the cutting device 1, the user may grasp the front grip 35a of the front handle 35 with one hand and grasp the rear grip 41 of the rear handle 40 with the other hand.

In the cutting device 1 of the representative embodiment described above, the rear handle 40 extends rearward from the fixed cover 11 by a relatively large distance in the direction parallel to the plane of the rotary blade 2. Therefore, when the user intends to cut a workpiece W while standing and one foot is (or both feet are) placed on the workpiece W, the cutting operation can be easily performed by grasping the rear grip 41. It is noted that the rear handle 40 extends rearward from the battery mount portion 30 that is joined (attached, affixed) to both the fixed cover 11 and the handle support portion 13. Because the handle support portion 13 also extends rearward from the fixed cover 11, it is possible to ensure sufficient rigidity with respect to the support of the rear handle 40. As a result, it is possible to ensure excellent handling and operability of the cutting device 1.

It is noted that, in this embodiment, the electric motor 20 is not arranged such that its motor axis extends parallel to the cutting plane of the rotary blade 2, but rather it is arranged such that its motor axis extends perpendicular to the cutting plane of the rotary blade 2 (i.e. a so-called "sidewinder" configuration). Therefore, it is not necessary to use a relatively expensive bevel gear (hypoid gear) mechanism in the reduction gear 15. As a result, it is possible to reduce the manufacturing cost of the cutting device 1.

Furthermore, in the representative embodiment, a brushless motor is used as the electric motor 20. Therefore, the electric motor 20 may be designed with a shorter length in the motor axis direction than in an embodiment, in which a brush motor having a commutator and brushes is used as the electric motor 20. Therefore, it may be possible to avoid a potential problem of an increase in the size of the cutting device 1 in the left-right direction, which may occur when a brush motor is arranged such that its motor axis extends perpendicular to the plane of a rotary blade.

The above representative embodiment may be modified in various ways. For example, although the handle support portion 13 is formed integrally with the fixed cover 11 and is preferably formed of the same metal material as the fixed cover 11, the handle support portion 13 can be manufactured as a separate (discrete) member from the fixed cover 11 and the handle support portion 13 may then be attached or affixed to the fixed cover 11 by using screws or any other suitable fixing devices, as was mentioned above. In such an embodiment, the handle support portion 13 may be formed of a different material than the material of the fixed cover 11. For example, the handle support portion 13 may be formed of resin. Further, in an embodiment in which the motor housing 21 is formed of resin, the motor housing 21 may be formed integrally with one or more other resin parts of the cutting device. For example, the motor housing 21 may be formed integrally with the battery mount portion 30 and the rear handle 40, and/or the handle support portion 13 (if the handle support portion 13 is formed of resin).

In the above representative embodiment, the battery mount portion 30, which has the rear handle 40 extending rearward from the fixed cover 11, is joined to the fixed cover 11, both directly and indirectly (via the handle support portion 13), by using the fixing screws 43, 44 and 45. However, each of the fixing screws 43, 44 and 45 may be replaced with any other suitable type of fixing device or connecting device, such as adhesive, rivets, bolts, etc., as long as sufficient support strength (rigidity or stiffness) for the rear handle 40 can be provided. Further, in the above embodiment, the battery mount portion 30 is joined to the fixed cover 11 directly and indirectly (via the handle support portion 13) at multiple positions along the extension direction of the rear handle 40. However, the handle support portion 13 may be eliminated, so that the battery mount portion 30 is directly joined (attached, affixed) to the right side (motor housing side) of the fixed cover 11 (e.g., to the rear half thereof) at multiple positions along the extension direction via screws or any other suitable type of fixing devices or connecting devices. Thus, it is also possible to ensure excellent handling and operability of the cutting device 1 with this arrangement. It may also be possible to configure the rear handle 40 as a separate (discrete) member from the battery mount portion 30 and to directly join (attach, affix) the rear handle 40 to the right side of the fixed cover 11 at multiple positions along the extension direction via screws or any other suitable type of fixing devices or connecting devices.

Further, in the above embodiment, the rear handle 40 is joined (attached, affixed), directly or indirectly, to the fixed cover 11 at the first, second and third fixing positions via the first, second and third fixing screws 43, 44 and 45, respectively. However, the number of fixing positions may be suitably determined depending on the length of the rearward extension of the rear handle 40 from the rearward-most edge surface of the fixed cover 11. For example, the number of fixing positions may be two or it may be four or more. It may be also possible for the handle 40 to be joined (attached, affixed) to the handle support portion 13 at only one fixing position.

Furthermore, the structure for joining (attaching, affixing) the rear handle 40 (directly or indirectly) to the fixed cover 11 at multiple positions can be also used in a cutting device that includes an electric motor arranged such that its motor axis extends perpendicular to the cutting plane of the rotary blade, as was disclosed above in the background section with respect to Japanese Laid-Open Patent Publication No. 2003-089101.

Still furthermore, although the above representative embodiment has been described in connection with the cutting device 1 powered by two battery packs 31, the above teachings regarding the support structure of the handle may be also advantageously applied to a cutting device powered by a single battery pack or to a cutting device powered by a commercially available AC power source, such as an AC 110 V power source (e.g., wall socket). In the latter embodiment, the battery mount portion 30 is replaced by a power cord with a wall plug.

Still furthermore, although the above representative embodiment has been described in connection with the cutting device 1 configured as a circular saw, the above teachings regarding the support structure of the handle may be also applied to other hand-held cutting devices, such as a cutter having a rotary diamond wheel as the rotary blade.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cutting devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A cutting device comprising:
   a device body comprising an electric motor, a circular rotary blade configured to be rotatably driven by the electric motor, a fixed cover configured to cover an upper half of the circular rotary blade, a handle including a grip configured to be grasped by a user and a handle support portion extending rearward from the fixed cover in a rearward direction opposite a cutting direction; and
   a base configured to support the device body on an upper side of the base,
wherein:
   a lower portion of the circular rotary blade protrudes downward from the base, and the protruding lower portion of the circular rotary blade is configured to cut into a workpiece as the cutting device moves in the cutting direction;
   the base has a front end opposite to a rear end thereof in the cutting direction;
   the handle extends along a direction parallel to a plane of the circular rotary blade and includes a rear portion that projects rearward beyond the rear end of the base;
   the grip is disposed at the rear portion of the handle;
   the handle is attached to the fixed cover adjacent to a front side of the grip in the direction opposite the cutting direction;
   the handle is joined, at least partly, to the fixed cover via the handle support portion;
   the handle support portion has a first side spaced from a second side thereof in a direction perpendicular to the cutting direction, the first side facing away from the handle; and
   the handle has a first side spaced from a second side thereof in the direction perpendicular to the cutting direction, the first side of the handle having a joining portion pressed against and connected to the second side of the handle support portion.

2. The cutting device according to claim 1, wherein each of the fixed cover and the handle support portion is formed of metal.

3. The cutting device according to claim 1, wherein:
   the device body further comprises a battery mount portion configured to detachably mount at least one battery pack as a power source for the electric motor;

the battery mount portion is disposed rearward of the electric motor in the direction opposite the cutting direction and extends rearward away from the electric motor; and the handle extends rearward from a rear portion of the battery mount portion in the direction opposite the cutting direction.

4. The cutting device according to claim 3, wherein:

the at least one battery pack comprises two battery packs, and the battery mount portion is configured such that the two battery packs are arranged side-by-side in a direction parallel to the cutting direction when mounted on the battery mount portion.

5. A cutting device comprising:

a device body comprising an electric motor, a circular rotary blade configured to be rotatably driven by the electric motor, a fixed cover configured to cover an upper half of the circular rotary blade, a handle including a grip configured to be grasped by a user and a battery mount portion configured to detachably mount at least one battery pack as a power source for the electric motor; and a base configured to support the device body on an upper side of the base, wherein:

a lower portion of the circular rotary blade protrudes downward from the base, and the protruding lower portion of the circular rotary blade is configured to cut into a workpiece as the cutting device moves in a cutting direction;

the base has a front end opposite to a rear end thereof in the cutting direction;

the handle extends along a direction parallel to a plane of the circular rotary blade and includes a rear portion that projects rearward beyond the rear end of the base;

the grip is disposed at the rear portion of the handle;

the handle is attached to the fixed cover adjacent to a front side of the grip in the cutting direction;

the battery mount portion is disposed rearward of the electric motor in the cutting direction and extends rearward away from the electric motor;

the handle extends rearward from a rear portion of the battery mount portion in a rearward direction opposite the cutting direction; and the battery mount portion directly contacts a portion of the fixed cover between the circular rotary blade and the electric motor in a direction perpendicular to the cutting direction.

6. The cutting device according to claim 5, further comprising a handle support portion extending rearward from the fixed cover in the direction opposite the cutting direction, wherein the rear portion of the battery mount portion is attached to a rearward portion of the fixed cover via the handle support portion.

7. The cutting device according to claim 6, wherein the handle comprises a D-shaped handle.

8. The cutting device according to claim 7, wherein the electric motor includes a motor shaft having a rotational axis extending parallel to a rotational axis of the rotary blade.

9. The cutting device according to claim 5, wherein:

the at least one battery pack comprises two battery packs, and the battery mount portion is configured such that the two battery packs are arranged side-by-side in a direction parallel to the cutting direction when mounted on the battery mount portion.

10. A cutting device comprising:

a device body comprising an electric motor, a circular rotary blade configured to be rotatably driven by the electric motor, a fixed cover configured to cover an upper half of the circular rotary blade, a handle including a grip configured to be grasped by a user and a battery mount portion configured to detachably mount two battery packs as a power source for the electric motor; and a base configured to support the device body on an upper side of the base, wherein:

a lower portion of the circular rotary blade protrudes downward from the base, and the protruding lower portion of the circular rotary blade is configured to cut into a workpiece as the cutting device moves in a cutting direction;

the base has a front end opposite to a rear end thereof in the cutting direction;

the handle comprises a D-shaped handle including a rear portion that projects rearward beyond the rear end of the base;

the electric motor includes a motor shaft having a rotational axis extending parallel to a rotational axis of the rotary blade;

the battery mount portion is disposed rearward of the electric motor and extends rearward away from the electric motor;

the handle extends rearward from a rear portion of the battery mount portion, and the battery mount portion is configured such that the two battery packs are arranged side-by-side in a direction parallel to the cutting direction when mounted on the battery mount portion.

11. The cutting device according to claim 10, wherein the electric motor is a brushless motor.

12. The cutting device according to claim 10, wherein the battery mount portion is attached to the fixed cover adjacent to a front side of the grip.

13. The cutting device according to claim 10, wherein the battery mount portion directly contacts a portion of the fixed cover between the circular rotary blade and the electric motor in a direction perpendicular to the cutting direction.

14. A cutting device comprising:

a device body comprising an electric motor, a circular rotary blade rotatably driven by the electric motor, a fixed cover configured to cover an upper half of the circular rotary blade, a handle having a trigger grip portion configured to be grasped by a user while pulling a trigger of the cutting device to operate the cutting device and a battery mount portion configured to detachably mount at least one battery pack as a power source for the electric motor; and a base configured to support the device body on an upper side of the base, wherein:

a lower portion of the circular rotary blade protrudes downward from the base, and the protruding lower portion of the circular rotary blade is configured to cut into a workpiece as the cutting device moves forward along a first direction;

the electric motor includes a motor shaft having a rotational axis extending in a second direction that is perpendicular or substantially perpendicular to the first direction;

the fixed cover has a first side opposite to a second side thereof in the second direction, an outer surface of the first side facing the electric motor;

the handle is attached to the first side of the fixed cover by a fastener extending through the battery mount portion and into the fixed cover, and the trigger grip portion is located rearward of the base in a third direction opposite the first direction.

15. The cutting device according to claim 14, wherein:

the battery mount portion is attached to the first side of the fixed cover, and the trigger grip portion is located rearward of the battery mount portion in the third direction.

16. The cutting device according to claim 15, wherein the battery mount portion directly contacts the first side of the fixed cover between the circular rotary blade and the electric motor in a direction perpendicular to the first direction.

17. The cutting device according to claim 14, wherein the circular rotary blade is rotatable about an axis parallel to the rotational axis of the motor shaft.

18. The cutting device according to claim 14, wherein the handle comprises a D-shaped handle.

19. The cutting device according to claim 14, wherein the handle is attached to the fixed cover forward of the trigger grip portion of the handle in the first direction.

20. The cutting device according to claim 14 further comprising:

a handle support portion extending rearward from the fixed cover in the third direction, wherein the handle is joined, at least partly, to the fixed cover via the handle support portion, wherein the handle support portion has a first side spaced from a second side thereof in the second direction, the first side facing away from the handle, and wherein the handle has a first side spaced from a second side thereof in the second direction, the first side of the handle having a joining portion pressed against and connected to the second side of the handle support portion.

21. A cutting device comprising:

a flat circular rotary blade configured to rotate in a cutting plane, an electric motor having a motor shaft configured to rotate about a rotational axis and to rotatably drive the rotary blade, the cutting plane of the rotary blade being perpendicular or substantially perpendicular to the rotational axis of the motor shaft, a fixed cover that covers an upper half of the rotary blade, a base supporting the fixed cover and having a front end and a rear end in a cutting direction of the cutting device, a lower portion of the rotary blade extending through a window in the base, a D-shaped handle fixedly attached to the fixed cover and extending rearward of the rear end of the base in a direction opposite the cutting direction, and a battery mount portion configured to detachably mount at least a first battery pack as a power source for the electric motor, wherein:

the battery mount portion is disposed rearward of the electric motor in the direction opposite the cutting direction and extends rearward away from the electric motor, the D-shaped handle is attached to a rear portion of the battery mount portion, the battery mount portion is attached to the fixed cover adjacent to a front side of the D-shaped handle, and the cutting device further comprises a handle support portion extending rearward from the fixed cover in the direction opposite the cutting direction, wherein the rear portion of the battery mount portion is attached to a rear half of the fixed cover via the handle support portion.

22. The cutting device according to claim 21, wherein the electric motor is a brushless motor.

23. The cutting device according to claim 22, wherein the battery mount portion is configured to detachably mount the first battery pack and a second battery pack arranged side-by-side in a direction parallel to the cutting direction.

* * * * *